(12) United States Patent
Shimomura

(10) Patent No.: US 11,606,345 B2
(45) Date of Patent: Mar. 14, 2023

(54) INFORMATION PROCESSING METHOD, INFORMATION PROCESSING APPARATUS AND INFORMATION PROCESSING SYSTEM

(71) Applicant: AdTECHNICA co. ltd., Shizuoka (JP)

(72) Inventor: Satoshi Shimomura, Shizuoka (JP)

(73) Assignee: AdTECHNICA co. ltd., Shizuoka (JP)

( * ) Notice: Subject to any disclaimer, the term of this patent is extended or adjusted under 35 U.S.C. 154(b) by 324 days.

(21) Appl. No.: 16/885,251

(22) Filed: May 27, 2020

(65) Prior Publication Data
US 2020/0351257 A1 Nov. 5, 2020

Related U.S. Application Data

(63) Continuation of application No. PCT/JP2018/043435, filed on Nov. 26, 2018.

(30) Foreign Application Priority Data

Nov. 30, 2017 (JP) .............................. JP2017-229948
Jun. 14, 2018 (JP) .............................. JP2018-113296

(51) Int. Cl.
*H04L 9/40* (2022.01)
*G06F 9/54* (2006.01)
(Continued)

(52) U.S. Cl.
CPC .............. *H04L 63/08* (2013.01); *G06F 9/542* (2013.01); *G06F 9/547* (2013.01); *G06F 21/44* (2013.01); *G06F 21/6218* (2013.01)

(58) Field of Classification Search
CPC ......... H04L 63/08; G06F 9/542; G06F 9/547; G06F 21/44; G06F 21/6218; G06F 9/54; G06F 9/468; G06F 21/629; G06Q 10/00
See application file for complete search history.

(56) References Cited

U.S. PATENT DOCUMENTS 5,018,096 A * 5/1991 Aoyama ................. G06F 21/31
340/5.74
5,832,214 A * 11/1998 Kikinis ................. G06F 21/575
726/19

(Continued)

FOREIGN PATENT DOCUMENTS

JP 2004206595 7/2004
JP 2007188441 7/2007

(Continued)

OTHER PUBLICATIONS

Office Action of Japan Counterpart Application, with English translation thereof, dated Jan. 16, 2018, pp. 1-9.

(Continued)

*Primary Examiner* — Aravind K Moorthy

(74) *Attorney, Agent, or Firm* — JCIPRNET

(57) ABSTRACT

An information processing method implemented by a computer, the method includes the steps of transmitting authentication information to a destination specified by a first user, receiving, from a terminal used by a second user corresponding to the destination, the authentication information and a second identification information for identifying the terminal, authenticating the terminal if the authentication information from the terminal is received, and storing the second identification information received from the terminal in association with a first identification information for identifying the first user, if the terminal has been authenticated.

13 Claims, 8 Drawing Sheets

(51) Int. Cl.
*G06F 21/44* (2013.01)
*G06F 21/62* (2013.01)

(56) References Cited

U.S. PATENT DOCUMENTS

| | | | | |
|---|---|---|---|---|
| 6,259,704 B1* | 7/2001 | Asahina | H04L 12/43 | 398/9 |
| 6,351,536 B1* | 2/2002 | Sasaki | H04L 9/0825 | 713/168 |
| 7,657,926 B1* | 2/2010 | Baker | H04L 63/0263 | 726/2 |
| 8,442,527 B1* | 5/2013 | Machiraju | H04W 12/069 | 713/184 |
| 9,172,699 B1* | 10/2015 | Vazquez | H04L 63/0823 | |
| 9,173,098 B1* | 10/2015 | Ran | H04W 12/06 | |
| 9,173,101 B1* | 10/2015 | Angelov | H04L 63/08 | |
| 9,430,629 B1* | 8/2016 | Ziraknejad | G06F 16/583 | |
| 9,444,805 B1* | 9/2016 | Saylor | H04L 63/08 | |
| 9,602,279 B1* | 3/2017 | Tran | H04L 9/0866 | |
| 9,882,914 B1* | 1/2018 | Co | H04L 63/105 | |
| 9,912,642 B1* | 3/2018 | Eidt | H04L 67/1097 | |
| 9,934,541 B1* | 4/2018 | Spertus | G06Q 50/265 | |
| 9,942,042 B1* | 4/2018 | Friedman | H04L 9/3231 | |
| 10,075,435 B1* | 9/2018 | Byrd | H04L 63/1458 | |
| 10,257,179 B1* | 4/2019 | Saylor | H04W 12/068 | |
| 10,511,592 B1* | 12/2019 | Phruksawan | H04L 63/166 | |
| 2002/0169988 A1* | 11/2002 | Vandergeest | H04L 63/0823 | 726/4 |
| 2003/0028808 A1* | 2/2003 | Kameda | H04L 63/162 | 726/13 |
| 2003/0037250 A1* | 2/2003 | Walker | H04L 63/04 | 380/270 |
| 2004/0088578 A1* | 5/2004 | Chao | H04L 63/205 | 726/6 |
| 2004/0139319 A1* | 7/2004 | Favazza | H04L 63/0807 | 713/168 |
| 2005/0010547 A1* | 1/2005 | Carinci | H04L 63/08 | |
| 2005/0216769 A1* | 9/2005 | Matsuoka | H04L 63/0823 | 726/5 |
| 2005/0273381 A1* | 12/2005 | Thomas | G06Q 10/00 | 705/7.42 |
| 2005/0289643 A1* | 12/2005 | Sato | H04L 63/0807 | 713/182 |
| 2006/0101270 A1* | 5/2006 | Laitinen | H04L 9/321 | 713/176 |
| 2007/0061572 A1* | 3/2007 | Imai | H04L 9/3026 | 713/169 |
| 2007/0091843 A1* | 4/2007 | Patel | H04W 8/04 | 370/331 |
| 2007/0118479 A1* | 5/2007 | Halsema | G06Q 20/382 | 705/51 |
| 2008/0005573 A1* | 1/2008 | Morris | H04L 9/3257 | 713/180 |
| 2008/0183862 A1* | 7/2008 | Kobayashi | H04L 43/0811 | 709/224 |
| 2008/0256458 A1* | 10/2008 | Aldred | G06F 21/6218 | 715/752 |
| 2009/0100503 A1* | 4/2009 | Doyle | H04L 63/08 | 726/3 |
| 2009/0210927 A1* | 8/2009 | Mokuya | H04L 9/3226 | 726/2 |
| 2009/0210934 A1* | 8/2009 | Innes | H04L 63/08 | 726/7 |
| 2009/0265772 A1* | 10/2009 | Hitchcock | H04L 63/08 | 726/7 |
| 2009/0282001 A1* | 11/2009 | Fukuda | H04H 60/32 | |
| 2011/0207454 A1* | 8/2011 | Garg | H04W 8/06 | 455/432.1 |
| 2011/0219429 A1* | 9/2011 | Lee | H04W 12/06 | 726/3 |
| 2012/0054839 A1* | 3/2012 | Friedlander | H04W 12/068 | 726/5 |
| 2012/0150912 A1* | 6/2012 | Ripberger | G06F 21/80 | 707/786 |
| 2013/0227658 A1* | 8/2013 | Leicher | H04L 63/0876 | 726/5 |
| 2014/0189796 A1* | 7/2014 | Mashimo | H04L 63/08 | 726/3 |
| 2014/0189808 A1* | 7/2014 | Mahaffey | H04L 63/083 | 726/4 |
| 2014/0259129 A1* | 9/2014 | Copsey | H04L 63/08 | 726/5 |
| 2014/0359102 A1* | 12/2014 | Kihara | H04L 63/107 | 709/223 |
| 2014/0366044 A1* | 12/2014 | Neeman | G06F 9/542 | 719/318 |
| 2015/0149777 A1* | 5/2015 | Kim | H04W 12/069 | 713/169 |
| 2015/0149778 A1* | 5/2015 | Nakano | H04L 63/0869 | 713/169 |
| 2015/0195816 A1* | 7/2015 | Lee | H04L 47/12 | 370/329 |
| 2015/0227732 A1* | 8/2015 | Doctor | G06F 21/31 | 726/4 |
| 2015/0249540 A1* | 9/2015 | Khalil | H04L 9/321 | 713/158 |
| 2015/0281254 A1* | 10/2015 | Sharma | H04L 63/0876 | 726/4 |
| 2016/0036802 A1* | 2/2016 | Mityagin | H04L 63/10 | 726/5 |
| 2016/0071340 A1* | 3/2016 | Kauth | G07C 9/20 | 340/5.2 |
| 2016/0072807 A1* | 3/2016 | Park | H04L 63/0876 | 713/171 |
| 2016/0080366 A1* | 3/2016 | Agarwal | H04L 63/0838 | 726/6 |
| 2016/0099938 A1* | 4/2016 | Seo | H04L 63/0869 | 713/169 |
| 2016/0116976 A1* | 4/2016 | Russell | G06F 3/0202 | 340/10.5 |
| 2016/0261537 A1 | 9/2016 | Yang et al. | | |
| 2016/0294783 A1* | 10/2016 | Piqueras Jover | H04W 12/04 | |
| 2016/0294841 A1* | 10/2016 | Lee | G06F 21/6218 | |
| 2016/0323275 A1* | 11/2016 | Choi | H04L 9/3234 | |
| 2016/0352746 A1* | 12/2016 | Anderson | H04L 63/08 | |
| 2017/0118641 A1* | 4/2017 | Ishibashi | H04L 9/14 | |
| 2017/0208054 A1* | 7/2017 | Hanay | H04L 63/06 | |
| 2017/0250974 A1* | 8/2017 | Antonyraj | H04W 12/50 | |
| 2017/0257367 A1* | 9/2017 | Han | H04W 84/18 | |
| 2017/0272415 A1* | 9/2017 | Zhao | H04L 63/0807 | |
| 2017/0279795 A1* | 9/2017 | Redberg | H04L 63/0861 | |
| 2017/0310815 A1* | 10/2017 | Ofir | H04W 4/021 | |
| 2017/0347224 A1* | 11/2017 | Robba | H04L 63/0876 | |
| 2018/0032750 A1* | 2/2018 | Hammel | H04L 63/0853 | |
| 2018/0041507 A1* | 2/2018 | Sivarajan | G06F 21/44 | |
| 2018/0096159 A1* | 4/2018 | Jacobson | G06F 21/6218 | |
| 2018/0255456 A1* | 9/2018 | Yin | H04W 12/041 | |
| 2018/0309748 A1* | 10/2018 | Li | G06F 21/41 | |
| 2018/0337950 A1* | 11/2018 | Clemm | H04L 61/5007 | |
| 2018/0365439 A1* | 12/2018 | Milman | H04L 51/212 | |
| 2019/0116169 A1* | 4/2019 | Bolotov | H04L 63/0853 | |
| 2019/0122006 A1* | 4/2019 | Hurry | H04L 63/107 | |
| 2019/0140837 A1* | 5/2019 | Cheng | H04W 12/40 | |

FOREIGN PATENT DOCUMENTS

| | | |
|---|---|---|
| JP | 2008052434 | 3/2008 |
| JP | 2014174639 | 9/2014 |
| JP | 2016162358 | 9/2016 |

OTHER PUBLICATIONS

"International Search Report (Form PCT/ISA/210) of PCT/JP2018/043435," dated Feb. 5, 2019, with English translation thereof, pp. 1-4.

(56) References Cited

OTHER PUBLICATIONS

"Written Opinion of the International Searching Authority (Form PCT/ISA/237) of PCT/JP2018/043435," dated Feb. 5, 2019, with English translation thereof, pp. 1-14.

* cited by examiner

INFORMATION PROCESSING METHOD, INFORMATION PROCESSING APPARATUS AND INFORMATION PROCESSING SYSTEM

CROSS-REFERENCE TO RELATED APPLICATIONS

The present application is a continuation application of International Application number PCT/JP2018/43435, filed on Nov. 26, 2018, which claims priority under 35 U.S.C § 119(a) to Japanese Patent Application No. 2017-229948, filed on Nov. 30, 2017, and Japanese Patent Application No. 2018-113296, filed on Jun. 14, 2018. The contents of this application are incorporated herein by reference in their entirety.

BACKGROUND OF THE DISCLOSURE

Organizations such as companies have introduced a safety confirmation system to confirm the safety of their employees in times of disaster. The safety confirmation system distributes messages to the employees and receives registrations of safety information from the employees' mobile terminals or the like at the time of the disaster.

Japanese Unexamined Patent Application Publication No. 2007-188441 discloses a technique of managing employees for each departmental organization, automatically distributing messages simultaneously to the employees in the departmental organization in a region where a disaster occurred at the time of the disaster, and manually distributing messages simultaneously from an administrator to the employees in the departmental organization or a subordinate organization belonging to the departmental organization. With such a technique, an organization can collect safety information of a large number of employees without having individual contact with the employees and promptly respond to disasters.

Japanese Unexamined Patent Application Publication No. 2007-188441 also describes that the safety of an employee's family member is confirmed by registering a name, an e-mail address, and the like of the employee's family member in association with the employee's information. In this case, the employee is required to disclose the information of the family member to the administrator of the system and to have the information registered. However, it is burdensome for the administrator to register and manage the family information of all the employees in the system. Further, the employee may be reluctant to disclose personal information of his/her family member to the administrator.

Further, it is also conceivable to configure the system so that the family member of the employee can register his/her own information in the system, but the family member may include a child or an elderly person, who is not familiar with operating a mobile terminal and the like, and it may be difficult for him/her to register the information himself/ herself.

BRIEF SUMMARY OF THE DISCLOSURE

The present disclosure focuses on this point, and an object thereof is to provide an information processing method, an information processing apparatus, and an information processing system capable of easily registering family information of an employee of an organization and authenticating a family terminal.

An information processing method implemented by a computer according to the first aspect of the present disclosure, the method includes the steps of transmitting authentication information to a destination specified by a first user, receiving, from a terminal used by a second user corresponding to the destination, the authentication information and second identification information for identifying the terminal, authenticating the terminal if the authentication information from the terminal is received, and storing the second identification information received from the terminal in association with first identification information for identifying the first user, if the terminal has been authenticated.

An information processing apparatus according to the second aspect of the present disclosure includes a communication interface that transmits authentication information to a destination specified by a first user and receives, from a terminal used by a second user corresponding to the destination, the authentication information and second identification information for identifying the terminal, a processor that authenticates the terminal if the communication interface receives the authentication information from the terminal, and a memory that stores, if the processor authenticates the terminal, the second identification information from the terminal received by the communication interface in association with the first identification information for identifying the first user.

An information processing system according to the third aspect of the present disclosure includes an information processing apparatus, and a terminal, wherein the information processing apparatus includes a communication interface that transmits authentication information to a destination specified by a first user and receives, from a terminal used by a second user corresponding to the destination, the authentication information and second identification information for identifying the terminal, a processor that authenticates the terminal if the communication interface receives the authentication information from the terminal, and a memory that stores the second identification information received by the communication interface from the terminal in association with first identification information for identifying the first user, if the processor has authenticated the terminal, and the terminal receives an input of the authentication information and transmits the authentication information to the information processing apparatus.

DETAILED DESCRIPTION OF THE DISCLOSURE

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

The First Embodiment

[An Outline of a Safety Confirmation System S]

Figure 1:
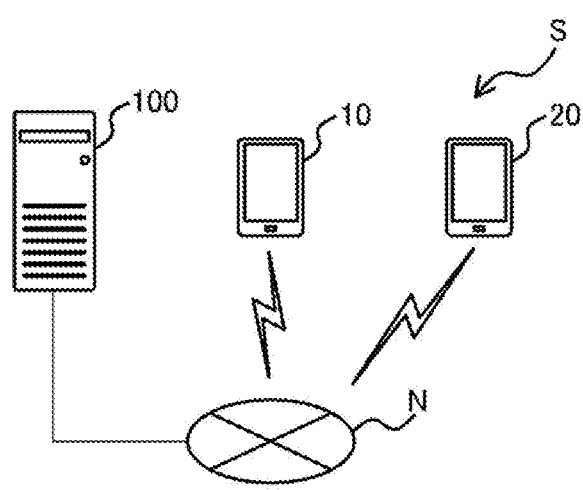
FIG. 1 is a schematic diagram of a safety confirmation system according to the first embodiment.

FIG. 1 is a schematic diagram of a safety confirmation system S according to the present embodiment. The safety confirmation system S is an information processing system including a management server 100, an employee terminal 10, and a family terminal 20. The management server 100, the employee terminal 10, and the family terminal 20 are connected via a network N such as the Internet. The safety confirmation system S may include other devices such as a server, a terminal, and the like.

The employee terminal 10 is a computer capable of communicating with the management server 100, which is used by an employee (a first user) of an organization. The family terminal 20 is a computer capable of communicating with the management server 100, which is used by an employee's family member (a second user). In the present embodiment, users of the employee terminal 10 and the family terminal 20 are, for example, the employee of the organization and their family member, but the present disclosure is not limited thereto. The first user registered in the safety confirmation system S and the second user invited by the first user to the safety confirmation system S can be application objects of the safety confirmation system S.

A mobile terminal such as a smart phone and a tablet, a personal computer, and the like can be used as the employee terminal 10 and the family terminal 20. The employee terminal 10 and the family terminal 20 are each connected to the network N by wired or wireless communication.

The management server 100 is a computer (information processing apparatus) that authenticates the employee terminal 10 and the family terminal 20 and provides predetermined functions such as a bulletin board for sharing information between the employee terminal 10 and the family terminal 20. The management server 100 is connected to the network N by wired or wireless communication and consists of a single computer or a cloud that is a collection of computer resources.

The management server 100 is managed by an administrator (a third user). The management server 100 registers and manages employee information (such as the employee's name, telephone number, e-mail address, and the name of a department to which he/she belongs). The safety confirmation system S according to the present embodiment enables the employee to invite his/her family member and register the family member with the safety confirmation system S without the administrator. That is, the safety confirmation system S has two separate stages, which are a stage where the administrator registers the employee and a stage where the employee registers his/her family member. Therefore, the employee does not need to disclose information about the family member to the administrator.

[Configurations of the Employee Terminal 10 and the Family Terminal 20]

Figure 2:
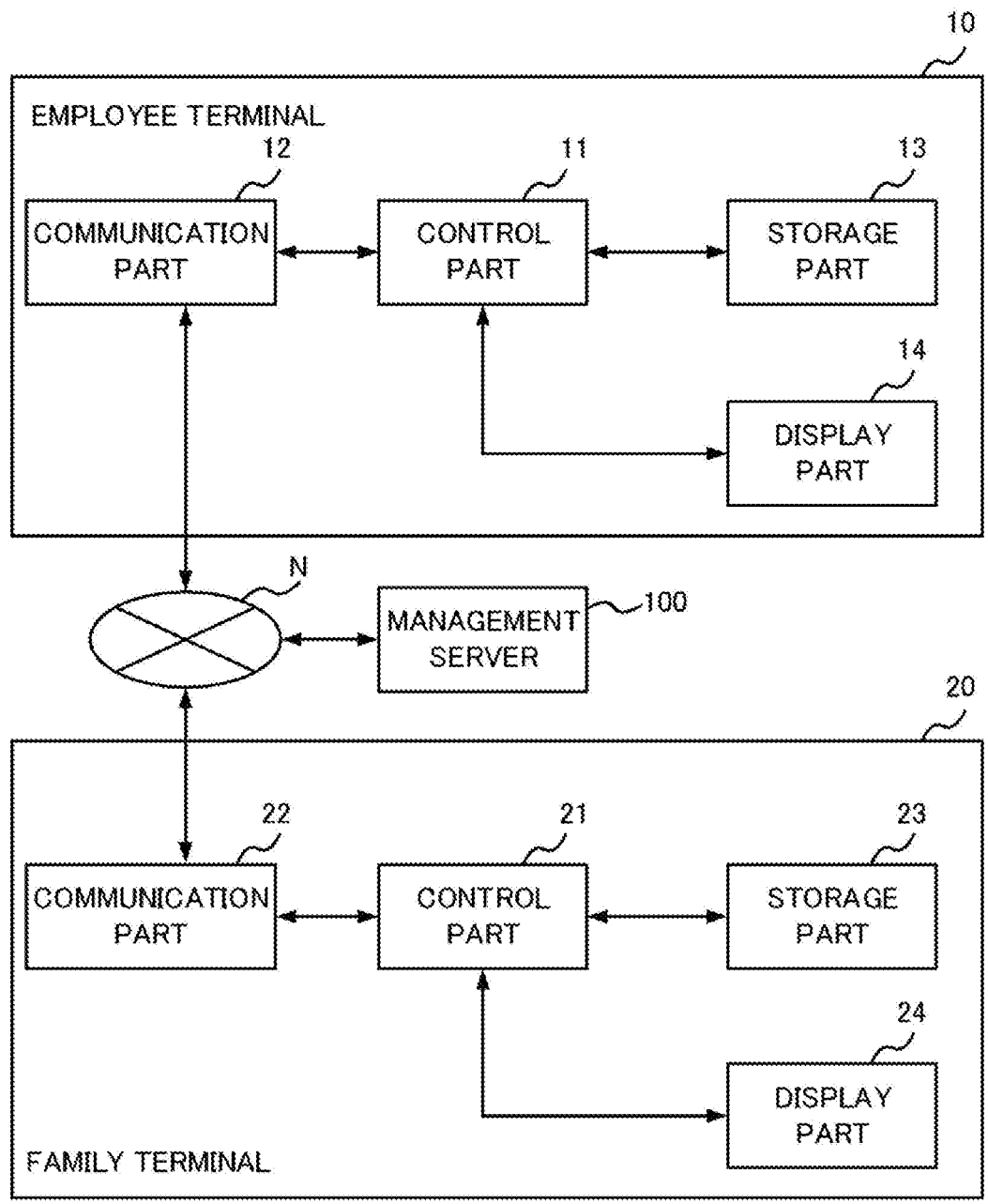
FIG. 2 is a block diagram of an employee terminal and a family terminal according to the first embodiment.

FIG. 2 is a block diagram of the employee terminal 10 and the family terminal 20 according to the present embodiment. In FIG. 2, arrows indicate main data flows, and there may be data flows other than those shown in FIG. 2. In FIG. 2, each block indicates a configuration of a functional unit, not a configuration of a hardware (device) unit. As such, the blocks shown in FIG. 2 may be implemented in a single device or separately in a plurality of devices. The transfer of data between the blocks may be performed via any means, such as a data bus, a network, a portable storage medium, or the like.

The employee terminal 10 includes a control part 11, a communication part 12, a storage part 13, and a display part 14. The family terminal 20 includes a control part 21, a communication part 22, a storage part 23, and a display part 24. The employee terminal 10 and the family terminal 20 may further include an operation part such as a keyboard, a mouse, and a touch panel, and an audio input/output part such as a speaker and a microphone.

The communication parts 12 and 22 are communication interfaces for communicating with the management server 100 through the network N. The communication parts 12 and 22 include processors, connectors, antennas, and the like for performing communication. The communication parts 12 and 22 perform predetermined processes on communication signals received from the management server 100 to acquire data, and input the acquired data to the control parts 11 and 21. Further, the communication parts 12 and 22 generate communication signals by performing predetermined processes on the data inputted from the control parts 11 and 21, and transmit the generated communication signals to the management server 100.

The display parts 14 and 24 have display devices, such as a liquid crystal display, an Organic Light Emitting Diode (OLED) display, or the like, capable of displaying various types of information under the control of the control parts 11 and 21.

The storage parts 13 and 23 are storage media including a Read Only Memory (ROM), a Random Access Memory (RAM), a hard disk drive, and the like. The storage parts 13 and 23 pre-store programs to be executed by the control parts 11 and 21.

The control parts 11 and 21 are processors such as a Central Processing Unit (CPU), for example, and execute predetermined functions by executing the programs stored in the storage parts 13 and 23. At least some of the functions of the control parts 11 and 21 may be performed by an electric circuit. Further, at least some of the functions of the control parts 11 and 21 may be executed by the programs executed via the network N.

The employee terminal 10 and the family terminal 20 according to the present embodiment are not limited to the specific configurations shown in FIG. 2. The employee terminal 10 and the family terminal 20 are each not limited to a single device, and may be configured by connecting two or more separate devices by wired or wireless connection.

[A Configuration of the Management Server 100]

Figure 3:
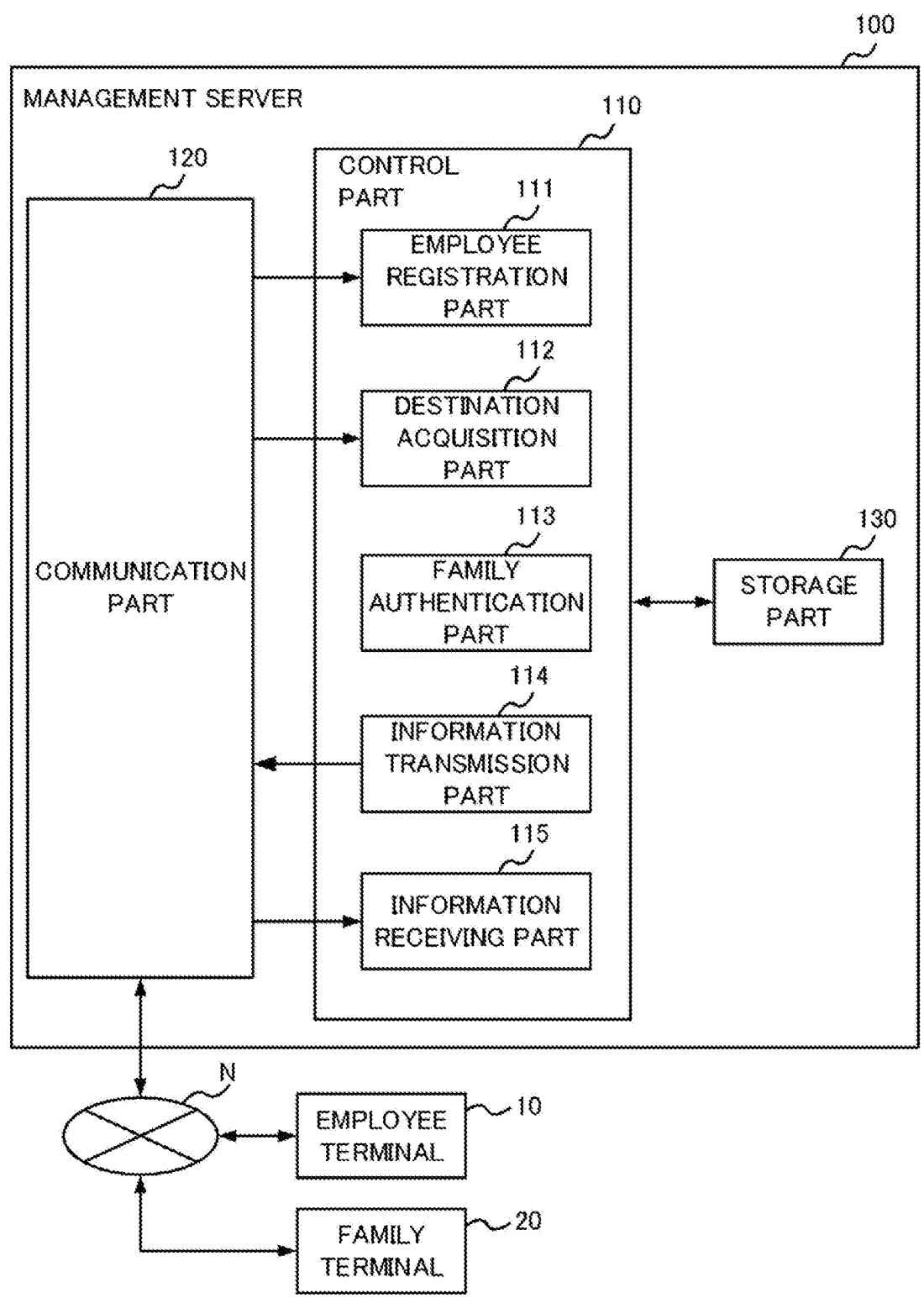
FIG. 3 is a block diagram of a management server according to the first embodiment.

FIG. 3 is a block diagram of the management server 100 according to the present embodiment. In FIG. 3, arrows indicate main data flows, and there may be data flows other than those shown in FIG. 3. In FIG. 3, each block indicates a configuration of a functional unit, not a configuration of a hardware (device) unit. As such, the blocks shown in FIG. 3 may be implemented in a single device or separately in a plurality of devices. The transfer of data between the blocks may be performed via any means, such as a data bus, a network, a portable storage medium, or the like.

The management server 100 includes a control part 110, a communication part 120, and a storage part 130. The control part 110 includes an employee registration part 111, a destination acquisition part 112, a family authentication part 113, an information transmission part 114, and an information receiving part 115.

The communication part 120 is a communication interface for communicating with the employee terminal 10 and the family terminal 20 through the network N. The communication part 120 includes a processor, a connector, an antenna, and the like for performing communication. The communication part 120 acquires data by performing a predetermined process on a communication signal received from the management server 100, and inputs the acquired data to the control part 110. The communication part 120 generates a communication signal by performing a predetermined process on the data inputted from the control part 110, and transmits the generated communication signal to the management server 100.

The storage part 130 is a storage medium including a ROM, a RAM, a hard disk drive, and the like. The storage part 130 pre-stores a program to be executed by the control part 110.

The control part 110 is a processor such as a CPU, and executes the program stored in the storage part 130 to function as the employee registration part 111, the destination acquisition part 112, the family authentication part 113, the information transmission part 114, and the information receiving part 115, and executes an information processing method shown in FIG. 6, which will be described later. At least some of the functions of the control part 110 may be performed by an electric circuit. Further, at least some of the functions of the control part 110 may be executed by the program executed via the network.

The employee registration part 111 registers employee information in the storage part 130. The employee information includes, for example, the employee's name, telephone number, e-mail address, and the name of a department to which he/she belongs, and is associated with an employee ID (a first identification information) for identifying the employee. The employee ID may be, for example, a random character string or numbers, or the employee's telephone number or e-mail address.

The employee registration part 111 may receive the employee information from a web page on the network N or an application executed on the management server 100, and may read a file including information of one or more employees. In addition, the employee registration part 111 may receive the employee information from the employee himself/herself or may receive the employee information from the administrator.

The destination acquisition part 112 acquires destination information of the family member (the second user) to be invited to the safety confirmation system S, which is specified by the employee (the first user) in the employee terminal 10, and stores the destination information in the storage part 130. The destination information includes a name of the family member and a destination of authentication information. In addition, the destination information may include other information about the family member, such as the relationship with the employee, an age of the family member, kana (Japanese phonetic syllabary characters) of the family member's name written in Chinese characters, and the like. The destination may be, for example, the family member's e-mail address or telephone number. The family member's Social Networking Service (SNS) account may be used as the destination.

If the destination acquisition part 112 acquires the destination information from the employee terminal 10, the family authentication part 113 generates the authentication information. The authentication information corresponds to the employee ID of the employee who uses the employee terminal 10. The family authentication part 113 may generate, as the authentication information, an authentication code including the employee ID or the information of the employee himself/herself or an authentication code (for example, a random character string or numbers) associated with the employee ID in the storage part 130. The family authentication part 113 stores the generated authentication information in the storage part 130.

The information transmission part 114 transmits, via the communication part 120, the authentication information generated by the family authentication part 113 to the destination indicated by the destination information acquired by the destination acquisition part 112. At this time, the information transmission part 114 transmits, to the destination, access information (such as the URL) to a web service or an application that is required for transmitting the authentication information from the family terminal 20 to the management server 100, together with the authentication information.

If the destination is an e-mail address, the information transmission part 114 transmits the authentication information by an e-mail message addressed to the e-mail address. If the destination is a telephone number, the information transmission part 114 transmits the authentication information by a Short Message Service (SMS) message addressed to the telephone number. If the destination is an SNS account, the information transmission part 114 transmits the authentication information by an SNS message addressed to the SNS account.

The family member corresponding to the destination receives the authentication information transmitted from the information transmission part 114 through the family terminal 20 or another terminal, and inputs the authentication information in the family terminal 20 to be authenticated and transmits the authentication information to the management server 100. At this time, the family terminal 20 transmits its own terminal information (second identification information) together with the inputted authentication information. Cookie information generated by the family terminal 20 and stored in the family terminal 20 or identification information (for example, International Mobile Equipment Identity (IMEI)) previously allocated to the family terminal may be used as the terminal information.

The information receiving part 115 receives the authentication information and the terminal information transmitted from the family terminal 20 via the communication part 120.

The family authentication part 113 compares the authentication information received by the information receiving part 115 with the authentication information stored in the storage part 130. If the authentication information received by the information receiving part 115 matches any of the authentication information stored in the storage part 130, the family authentication part 113 authenticates the family terminal 20 that is the transmission source of the authentication information, and stores the terminal information (the second identification information) received together with the authentication information in the storage part 130 in association with the employee ID (the first identification information). Furthermore, the family authentication part 113 may authenticate the family terminal 20 by comparing, in addition to the authentication information, the family member's name and the kana of the family member's name transmitted from the family terminal 20 with the destination information.

The authenticated family terminal 20 transmits the terminal information when the employee receives at least some of the functions available in the safety confirmation system S.

An example of a function available to the employee is, for example, a bulletin board function for sharing information between the employee and his/her family.

The information receiving part 115 receives the terminal information transmitted from the family terminal 20 via the communication part 120. The family authentication part 113 then compares the terminal information received by the information receiving part 115 with the terminal information stored in the storage part 130. If the terminal information received by the information receiving part 115 matches any of the terminal information stored in the storage part 130, the family authentication part 113 permits the family terminal 20 that is the transmission source of the terminal information to use the function.

The management server 100 according to the present embodiment is not limited to the specific configuration shown in FIG. 3. The management server 100 is not limited to a single device, and may be configured by connecting two or more separate devices by wired or wireless connection.

[A Display of the Employee Terminal 10]

Figure 4:
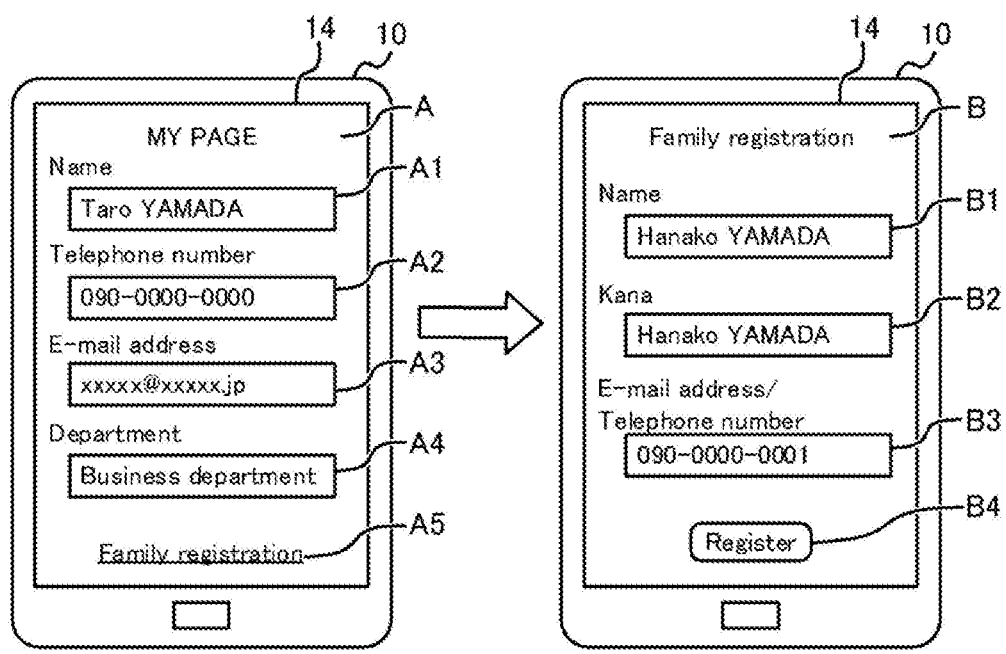
FIG. 4 is a front view of the employee terminal according to the first embodiment.

FIG. 4 is a front view of the employee terminal 10 according to the present embodiment. First, the employee terminal 10 receives an input of the employee ID from the employee on a login screen (not shown in figures), and transmits the input to the management server 100. The management server 100 reads the employee information associated with the employee ID received from the employee terminal 10 from the storage part 130, and transmits the employee information to the employee terminal 10.

The employee terminal 10 displays the employee information received from the management server 100 on the display part 14 as a screen A. The screen A includes an employee's name A1, telephone number A2, e-mail address A3, and the name of a department to which the employee belongs A4. The employee terminal 10 may receive the change of the information by an operation performed by the employee on the screen A. Further, the screen A includes a link A5 to a screen B for registering a family member. The screen A may include other information.

After the employee presses the link A5 on the screen A, the employee terminal 10 displays the screen B for registering a family member on the display part 14. The screen B includes a name field B1 for receiving the input of the family member's name, a kana field B2 for receiving the input of the kana of the family member's name, a destination field B3 for receiving the input of the destination corresponding to the family member, and a registration button B4. In the destination field B3, an e-mail address or a telephone number can be inputted as the destination. Further, an SNS account may be allowed to be inputted in the destination field B3.

After the employee presses the registration button B4 on the screen B, the employee terminal 10 transmits the inputted name and destination as the destination information to the management server 100. Thereafter, in the management server 100, the destination acquisition part 112 acquires the destination information, the family authentication part 113 generates the authentication information (the authentication code), and the information transmission part 114 transmits the message indicating the authentication information to the family terminal 20, as described above.

[A Display of the Family Terminal 20]

Figure 5:
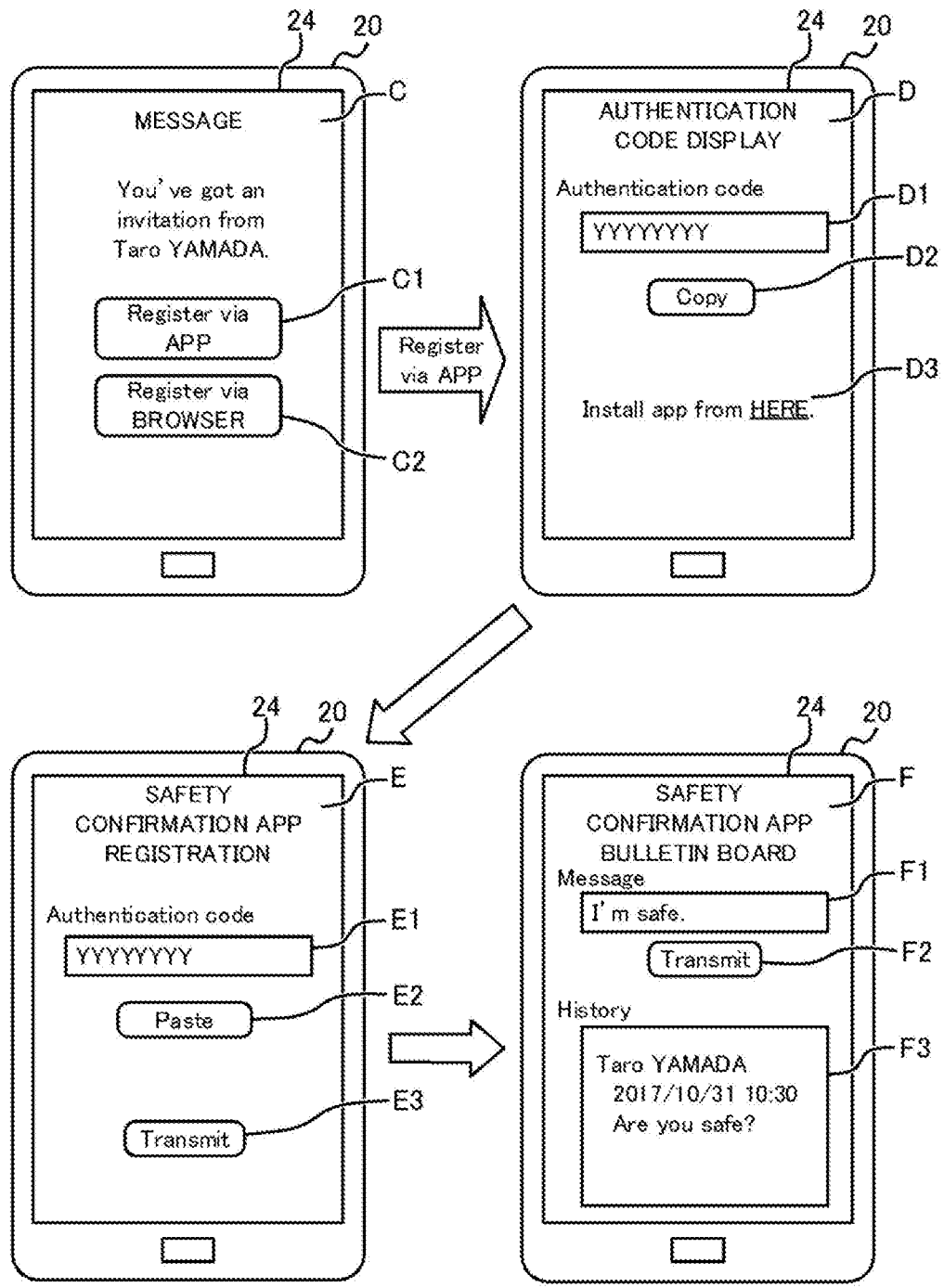
FIG. 5 is a front view of the family terminal according to the first embodiment.
Figure 6:
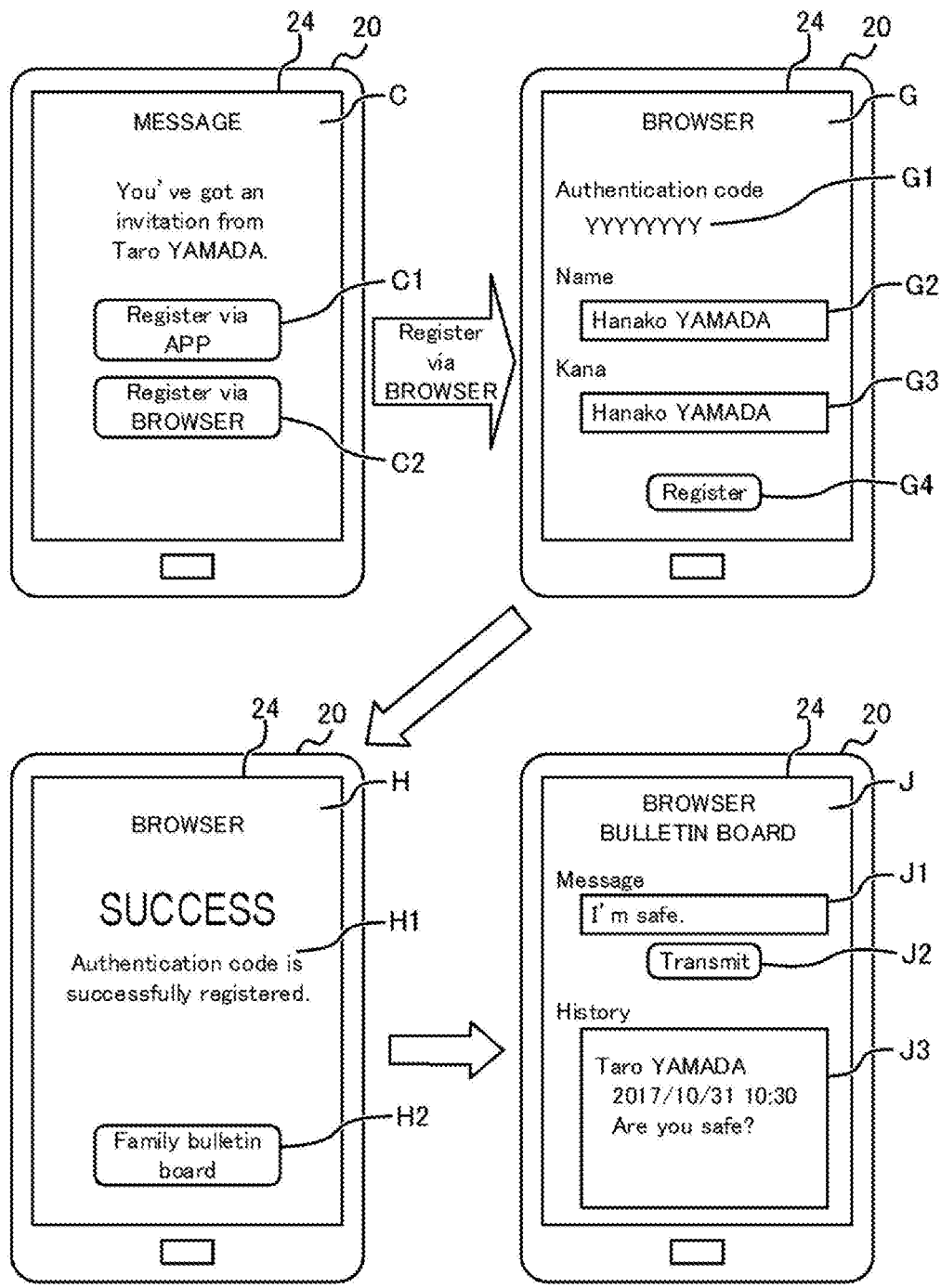
FIG. 6 is the front view of the family terminal according to the first embodiment.

FIG. 5 and FIG. 6 are front views of the family terminal 20 according to the present embodiment. The family terminal 20 displays a screen C indicating a message received from the management server 100 on the display unit 24. The screen C includes a first button C1 for using the safety confirmation system S in an application, and a second button C2 for using the safety confirmation system S in a web browser. If the family member using the family terminal 20 presses the first button C1 in the screen C, the family terminal 20 displays a screen D on the display part 24 shown in FIG. 5. On the other hand, if the family member using the family terminal 20 presses the second button C2 in the screen C, the family terminal 20 displays a screen G on the display unit 24 shown in FIG. 6.

First, screen transitions occurring in a case where the first button C1 is pressed in the screen C that is illustrated in FIG. 5 will be described. The screen D includes an authentication code D1 received from the management server 100, a copy button D2 for copying the authentication code D1 onto a memory, and a link D3 to the web service or the application that is required for transmitting the authentication information to the management server 100.

If the link D3 is pressed after the family member presses the copy button D2 on the screen D, the family terminal 20 determines whether the application corresponding to the link D3 is installed in the family terminal 20. If the application corresponding to the link D3 is not installed in the family terminal 20, the family terminal 20 opens a website or an application distributing the application and installs the application.

If the application corresponding to the link D3 has already been installed or is newly installed in the family terminal 20, the family terminal 20 displays a screen E of the application on the display part 24.

The screen E includes an authentication code field E1 for receiving the input of the authentication code, a paste button E2 for pasting the authentication code on the memory into the authentication code field E1, and a transmission button E3. If the family member presses the transmission button E3 after entering the authentication code in the authentication code field E1 in the screen E, the family terminal 20 transmits the inputted authentication code and the terminal information of the family terminal 20 to the management server 100.

Then, in the management server 100, the information receiving part 115 receives the authentication information (the authentication code) and the terminal information, and the family authentication part 113 authenticates the family terminal 20 on the basis of the received authentication information and stores the terminal information in the storage part 130, as described above.

After the family terminal 20 is authenticated, the family terminal 20 accesses the predetermined function such as the bulletin board function in the safety confirmation system S. At this time, the family terminal 20 transmits its own terminal information to the management server 100. In the management server 100, as described above, the information receiving part 115 receives the terminal information, and the family authentication part 113 checks the received terminal information to permit the family terminal 20 to use the bulletin board function. If the family authentication part 113 permits the family terminal 20 to use the bulletin board function, the management server 100 transmits the information for displaying the bulletin board to the family terminal 20.

The family terminal 20 displays, on the display part 24, a screen F based on the information for displaying the bulletin board received from the management server 100. The screen F includes a message field F1 for receiving the input of a message, a transmission button F2, and a history F3 of messages posted in the past. The history F3 lists messages sent in the past from the employee or the family. If the family member presses the transmission button F2 in the screen F, the family terminal 20 transmits the message inputted in the message field F1 to the management server 100. The screen F may be configured to be capable of transmitting positional information of the family terminal 20 and a captured image in addition to the message.

Next, the screen transitions occurring in a case where the second button C2 is pressed in the screen C that is illustrated in FIG. 6 will be described. The screen G includes an authentication code G1 received from the management server 100, a name field G2 for receiving the input of the family member's name, a kana field G3 for receiving the input of the kana of the family member's name, and a registration button G4. The authentication code G1 is maintained by the family terminal 20 and need not be entered by the family.

If the family member presses the registration button G4 after entering information into the name field G2 and the kana field G3 in the screen G, the family terminal 20 transmits the inputted name and kana as well as the authentication code and the terminal information of the family terminal 20 to the management server 100.

Then, in the management server 100, the information receiving part 115 receives the authentication information (the authentication code) and the terminal information, and the family authentication part 113 authenticates the family terminal 20 on the basis of the received authentication information and stores the terminal information in the storage part 130, as described above. In this case, the management server 100 may perform authentication using the inputted name and kana in addition to the authentication information. The management server 100 transmits a message indicating that the terminal information is stored to the family terminal 20.

The family terminal 20 displays a screen H of the web browser on the display part 24 upon receiving a message indicating that the terminal information is stored from the management server 100. The screen H includes a message H1 indicating that the terminal information is stored and a button H2 for displaying the family bulletin board.

If the family member presses the button H2 in the screen H, the family terminal 20 transmits its own terminal information to the management server 100. In the management server 100, as described above, the information receiving part 115 receives the terminal information, and the family authentication part 113 checks the received terminal information to permit the family terminal 20 to use the bulletin board function. If the family authentication part 113 permits the family terminal 20 to use the bulletin board function, the management server 100 transmits the information for displaying the bulletin board to the family terminal 20.

The family terminal 20 displays, on the display part 24, a screen J based on the information for displaying the bulletin board received from the management server 100. The screen J includes a message field J1 for receiving the input of a message, a transmission button J2, and a history J3 of messages posted in the past. The history J3 lists messages sent in the past from the employee or the family. If the family member presses the transmission button J2 in the screen J, the family terminal 20 transmits the message inputted to the message field J1 to the management server 100. The screen J may be configured to be capable of transmitting positional information of the family terminal 20 and a captured image in addition to the message.

The screens A to J shown in FIGS. 4 to 6 are examples, and the layouts of the respective screens, the information displayed on the respective screens, and the information that can be entered on the respective screens may be changed. In addition, two or more screens of the screens A to J may be integrated, or one screen may be divided into two or more screens.

[A Flowchart of an Information Processing Method]

Figure 7:
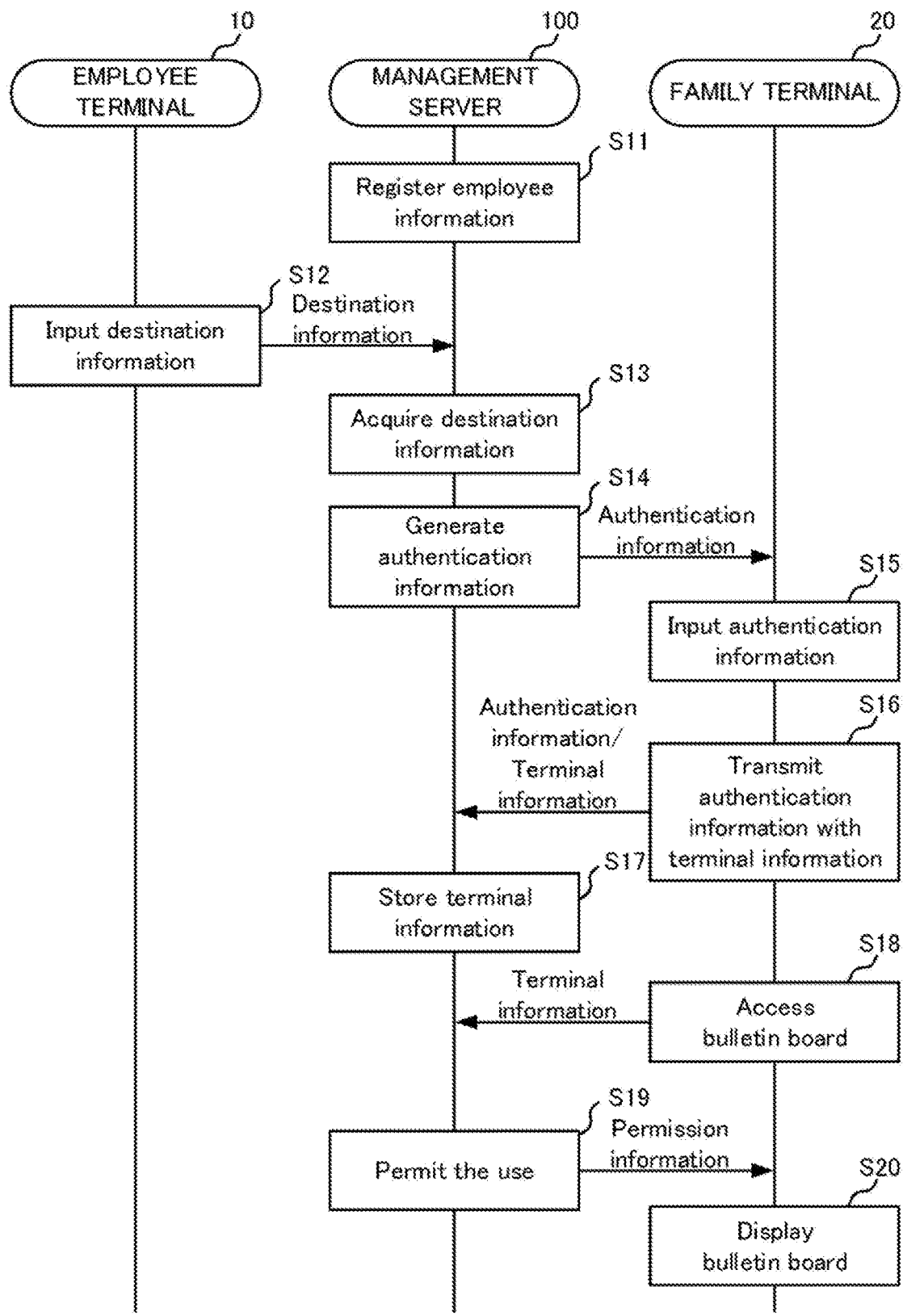
FIG. 7 is a sequence diagram of an information processing method according to the first embodiment.

FIG. 7 is a sequence diagram of an information processing method according to the present embodiment. First, the employee registration part 111 of the management server 100 registers the employee information in the storage part 130 (step S11).

The employee inputs the destination information in the employee terminal 10 (the screen B in FIG. 4) (step S12). The employee terminal 10 transmits the inputted destination information to the management server 100.

In the management server 100, the destination acquisition part 112 acquires the destination information transmitted from the employee terminal 10 (step S13). The family authentication part 113 generates the authentication information if the destination information is acquired from the employee terminal 10 in step S13 (step S14). The information transmission part 114 then transmits, via the communication part 120, the authentication information generated by the family authentication part 113 in step S14 to the destination indicated by the destination information acquired by the destination acquisition part 112 in step S13.

The family member corresponding to the destination receives the authentication information transmitted from the information transmission part 114 through the family terminal 20 or another terminal (the screens C, D, and G in FIGS. 5 and 6). If using the safety confirmation system S in the application, the family member installs the application in the family terminal 20 to be authenticated as required, and then inputs the authentication information on the application (the screen E in FIG. 5) (step S15). If using the safety confirmation system S in the web browser, inputting the authentication information in step S15 is omitted. The family terminal 20 then transmits its own terminal information (the second identification information) together with the inputted authentication information to the management server 100 (step S16).

In the management server 100, the information receiving part 115 receives the authentication information and the terminal information transmitted from the family terminal 20. The family authentication part 113 authenticates the family terminal 20 on the basis of the authentication information received by the information receiving part 115, and stores the terminal information (the second identification information) received together with the authentication information in the storage part 130 in association with the employee ID (the first identification information) (step S17).

If accessing the predetermined function such as the bulletin board function, the authenticated family terminal 20 transmits its own terminal information to the management server 100 (step S18). In the management server 100, the information receiving part 115 receives the terminal information transmitted from the family terminal 20. The family authentication part 113 checks the received terminal information to permit the family terminal 20 to use the bulletin board, and transmits the information for displaying the bulletin board to the family terminal 20 (step S19).

The family terminal 20 displays a bulletin board screen (the screen F in FIG. 5 or the screen J in FIG. 6) based on the information for displaying the bulletin board received from the management server 100 (step S20).

Effects of the First Embodiment

The safety confirmation system S according to the present embodiment has two separate stages, which are a stage where the administrator registers the employee and a stage where the employee registers his/her family. Therefore, the employee does not need to disclose the family information to the administrator. Further, the burden on the administrator to manage the employee's family can be reduced.

In addition, the employee invites family members after inputting the family information in advance, and so even a family member who is not familiar with operating the family terminal 20, such as a child or an elderly person, can easily register.

The management server 100 automatically generates the authentication information and transmits the authentication information to the destination after the employee inputs the destination corresponding to the family member, and so it is not necessary for the employee to transmit the authentication information, and there is little risk that the authentication information would be misused by a third party.

The Second Embodiment

The safety confirmation system S according to the present embodiment performs an operation confirmation process of the family terminal 20 in addition to the process of the first embodiment. As a result, it is possible to confirm whether the family terminal 20 authenticated in the first embodiment is still used by the family member thereafter. Other configurations and processes are the same as those of the first embodiment.

[A Configuration of the Management Server 100]

Figure 8:
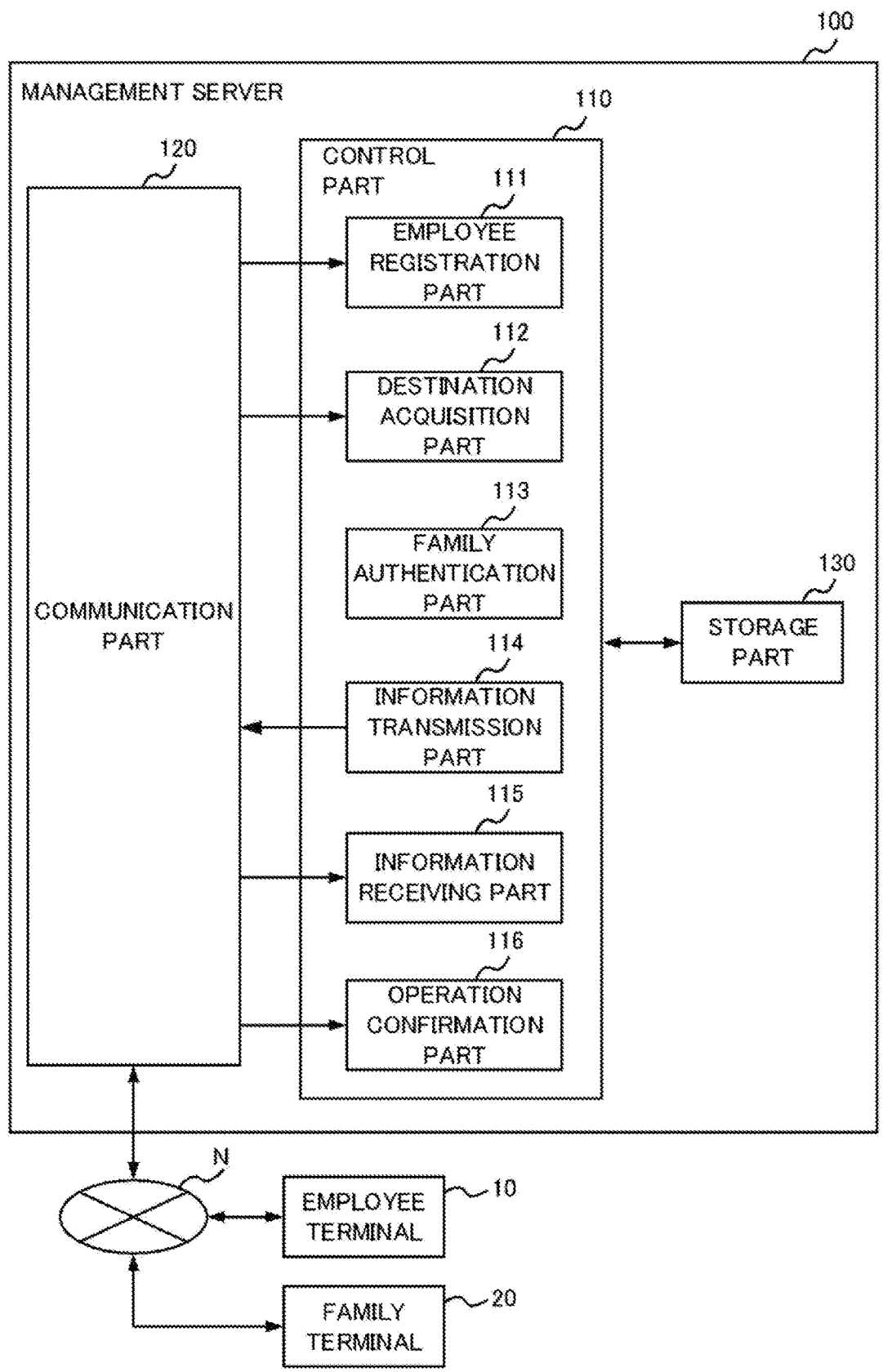
FIG. 8 is a block diagram of the management server according to the second embodiment.

FIG. 8 is a block diagram of the management server 100 according to the present embodiment. The control part 110 of the management server 100 according to the present embodiment further includes an operation confirmation part 116 in addition to the configuration of FIG. 3.

The operation confirmation part 116 transmits an operation inquiry message to the family terminal 20 authenticated in the first embodiment, for example, if a predetermined time has passed after the authentication of the family terminal 20 or the previous inquiry. The destination information acquired by the destination acquisition part 112 may be used as the destination of the inquiry message, or the terminal information acquired by the information receiving part 115 may be used. The inquiry message includes a link to the safety confirmation system S.

If the destination information is used as the destination, the operation confirmation part 116 transmits the inquiry message to, for example, the e-mail address, the telephone number, or the SNS account indicated by the destination information. If the terminal information is used as the destination, the operation confirmation part 116 transmits the inquiry message to the application installed in the family terminal 20 associated with the terminal information, for example.

The family member who receives the inquiry message responds to the message through the authenticated family terminal 20 and accesses the safety confirmation system S. At this time, the family terminal 20 transmits its own terminal information (the second identification information) to the management server 100.

The information receiving part 115 of the management server 100 receives the terminal information transmitted from the family terminal 20 via the communication part 120. If the information receiving part 115 receives the terminal information from the family terminal 20 within a predetermined time from the transmission of the inquiry message, the operation confirmation part 116 determines that there is a response from the family terminal 20.

If the information receiving part 115 does not receive the terminal information from the family terminal 20 even though the predetermined period has passed from the transmission of the inquiry message, the operation confirmation part 116 determines that there is no response from the family terminal 20. If it is determined that there is no response from the family terminal 20, the operation confirmation part 116 notifies the employee terminal 10 having the employee ID associated with the family terminal 20 that there is no response from the family terminal 20.

If it is determined that there is no response from the family terminal 20, the operation confirmation part 116 may transmit the inquiry message to the family terminal 20 again. If it is determined that there is no response from the family terminal 20 even though the inquiry message has been transmitted a predetermined number of times, the operation confirmation part 116 notifies the employee terminal 10 that there is no response from the family terminal 20.

The employee who receives the notification inputs the destination information about the family member again in the employee terminal 10. Thereafter, the management server 100 authenticates the family terminal 20 in a similar manner as in the first embodiment.

Effects of the Second Embodiment

According to the present embodiment, it is possible to periodically confirm the operation of the family terminal 20 authenticated by the safety confirmation system S, and to prompt the employee to re-authenticate the family terminal 20 if there is no response. Accordingly, even if the terminal being used by a family member has changed, a new terminal can be authenticated as the family terminal 20 without delay. With such a configuration, it is possible to reduce situations in which the family terminal 20 cannot access the safety confirmation system S at a time when the safety confirmation by the safety confirmation system S is actually required.

The present disclosure is explained on the basis of the exemplary embodiments. The technical scope of the present disclosure is not limited to the scope explained in the above embodiments and it is possible to make various changes and modifications within the scope of the disclosure. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The processors of the management server 100, the employee terminal 10, and the family terminal 20 are the main components of the respective steps (processes) included in the information processing method shown in FIG. 7. That is, the processors of the management server 100, the employee terminal 10, and the family terminal 20 perform the information processing method shown in FIG. 7 by reading a program for executing the information processing method shown in FIG. 7 from the storage part and executing the program to control the respective units in the management server 100, the employee terminal 10, and the family terminal 20.

The steps included in the information processing method shown in FIG. 7 may be partially omitted, the order of the steps may be changed, or a plurality of steps may be performed in parallel.

What is claimed is:

1. An information processing method implemented by a computer, the method comprising:
   a transmitting step, transmitting authentication information to a destination specified by a first user;
   a receiving step, receiving, from a terminal used by a second user corresponding to the destination, the authentication information and a second identification information for identifying the terminal;
   an authenticating step, authenticating the terminal if the authentication information from the terminal is received;
   a storing step, storing in a storage part, the second identification information received from the terminal in association with a first identification information for identifying the first user, if the terminal has been authenticated; and
   a second storing step, storing in the storage part in association with each other, information about an employee specified by an administrator, the first identification information for identifying the employee, and the authentication information, wherein
   the transmitting step transmits, to a destination specified by the employee, the authentication information associated with the first identification information of the employee in the storage part, and
   the authenticating step stores the second identification information received with the authentication information from the terminal in the storage part in association with the first identification information associated with the authentication information in the storage part, on a condition that the authentication information received from the terminal matches the authentication information stored in the storage part.

2. The information processing method according to claim 1, wherein
   the authenticating step permits the terminal to use at least some functions provided by the computer available to the employee, if the second identification information is stored in the storage part.

3. The information processing method according to claim 2, wherein
   the authentication step permits the terminal to use a function for sharing information between the employee and the user, if the second identification information is stored in the storage part.

4. The information processing method according to claim 1, further comprising
   a generation step, generating the authentication information associated with the first identification information, and storing the first identification information and the information related to the destination in the storage part in association with each other, when the information related to the destination is specified by the employee.

5. The information processing method according to claim 1, wherein
   the transmitting step transmits the authentication information to at least one of a telephone number, an e-mail address, or a Social Networking Service account specified by the employee as the destination.

6. The information processing method according to claim 1, wherein
   the second identification information is information generated by the terminal and stored in the terminal.

7. The information processing method according to claim 1, further comprising:
   a confirming step, confirming that the terminal is operating, in a case if a message is transmitted to the terminal and the computer is accessed by the terminal that receives the message.

8. The information processing method according to claim 1, wherein
   the transmitting step transmits, to the destination specified by the employee, access information to a web service or an application that is required for the user to transmit the authentication information from the terminal, together with the authentication information.

9. The information processing method according to claim 1, further comprising:
   a second transmitting step, transmitting a message to the terminal if a predetermined time has passed after storing the second identification information in the storage part.

10. The information processing method according to claim 9, further comprising:
    a third transmitting step, transmitting a notification to the employee if the second identification information is not received from the terminal that has received the message.

11. The information processing method according to claim 10, further comprising:
    a re-transmitting step, re-transmitting, to the destination specified by the employee that has received the notification, the authentication information associated with the first identification information of the employee in the storage part if the second identification information is not received from the terminal that has received the message.

12. An information processing apparatus comprising:
    a communication interface that transmits authentication information to a destination specified by a first user and receives, from a terminal used by a second user corresponding to the destination, the authentication information and a second identification information for identifying the ten Anal;
    a processor that authenticates the terminal if the communication interface receives the authentication info illation from the terminal; and
    a memory that stores, if the processor authenticates the terminal, the second identification information from the terminal received by the communication interface in association with a first identification information for identifying the first user, and that stores in association with each other, information about an employee specified by an administrator, the first identification information for identifying the employee, and the authentication information, wherein
    the communication interface transmits, to a destination specified by the employee, the authentication information associated with the first identification information of the employee in the memory, and
    the processor stores the second identification information received with the authentication information from the terminal in the memory in association with the first identification information associated with the authentication information in the memory, on a condition that the authentication information received from the terminal matches the authentication information stored in the memory.

13. An information processing system comprising:
an information processing apparatus; and
a terminal, wherein
the information processing apparatus includes:
- a communication interface that transmits authentication information to a destination specified by a first user and receives, from a terminal used by a second user corresponding to the destination, the authentication information and a second identification information for identifying the terminal,
- a processor that authenticates the terminal if the communication interface receives the authentication information from the terminal, and
- a memory that stores the second identification information received by the communication interface from the terminal in association with a first identification information for identifying the first user, if the processor has authenticated the terminal, and that stores in association with each other, information about an employee specified by an administrator, the first identification information for identifying the employee, and the authentication information, wherein the communication interface transmits, to a destination specified by the employee, the authentication information associated with the first identification information of the employee in the memory, and the processor stores the second identification information received with the authentication information from the terminal in the memory in association with the first identification information associated with the authentication information in the memory, on a condition that the authentication information received from the terminal matches the authentication information stored in the memory, and the terminal receives an input of the authentication information and transmits the authentication information to the information processing apparatus.

* * * * *